United States Patent [19]

Biardi

[11] 3,960,516

[45] June 1, 1976

[54] GRINDING WHEEL MANUFACTURE

[75] Inventor: Giuseppe Biardi, Corsico (Milan), Italy

[73] Assignee: Norton Company, Worcester, Mass.

[22] Filed: May 10, 1974

[21] Appl. No.: 468,721

[30] Foreign Application Priority Data

May 29, 1973 Italy .................................. 24692/73

[52] U.S. Cl. ............................. 51/293; 51/206 R; 51/298 R; 51/309 R; 264/328
[51] Int. Cl.² ...................... B24B 5/04; C09K 3/14
[58] Field of Search ................. 51/298, 299, 206 R, 51/209 R, 309, 293; 264/328

[56] References Cited

UNITED STATES PATENTS

| | | | |
|---|---|---|---|
| 2,150,886 | 3/1939 | Pyl | 51/209 |
| 2,279,208 | 4/1942 | Shaw | 51/298 |
| 2,398,890 | 4/1946 | Howard | 51/298 |
| 2,683,572 | 7/1954 | Morin | 264/328 |
| 2,713,369 | 7/1955 | Strahm | 264/328 |
| 3,105,655 | 10/1963 | Park et al. | 264/328 |
| 3,416,905 | 12/1968 | Waugh | 51/298 |

FOREIGN PATENTS OR APPLICATIONS

| | | | |
|---|---|---|---|
| 1,905,892 | 10/1969 | Germany | 51/293 |

*Primary Examiner*—Donald J. Arnold
*Attorney, Agent, or Firm*—Oliver W. Hayes

[57] ABSTRACT

A grinding wheel is made by locating a grindstone element in a molding tool and injection-molding a supporting part so that a portion of the grindstone element is embedded in the supporting part and securely bonded thereto by the molding operation. Recesses in the embedded portion of the grindstone element ensure good torque transmission between the molded supporting part and the grindstone element.

1 Claim, 5 Drawing Figures

GRINDING WHEEL MANUFACTURE

The present invention relates to a process for the manufacture and assembly of grinding wheels and to the produce obtained by the process.

As known, grinding wheels comprise a grindstone element made of abrasive material used for removal of material from a workpiece and a supporting part, which may be of abrasive material, of metal, of plastics or other material, by means of which the grinding wheel is fitted to the spindle of an operating machine. Except where the supporting part is made of abrasive material and is integral with the grindstone element, the supporting part is rigidly connected to the grindstone element by adhesive, screws, rivets or other suitable means.

In previously known processes for the manufacture of grinding wheels practical difficulty has been encountered in ensuring a secure connection between the grindstone element and the supporting part. Where adhesive is used the adhesive bond is not always sufficiently strong for the transmission of high torque, whilst the use of fixing means such as screws and rivets to secure the grindstone element to the supporting part is not always practicable and entails a labor-intensive assembly process.

Moreover, the processes now in use for the production of grinding wheels are not always sufficiently precise to ensure perfect centering between the grindstone element and the supporting part.

Problems also arise where the supporting part is formed in one piece from the same abrasive material as that from which the grindstone element is made, because costly work is required to form the supporting part with the required precision for assembly on an operating machine.

An object of the present invention is to avoid as far as possible the abovementioned disadvantages of known processes for the manufacture of grinding wheels by providing a process whereby the labor required is reduced considerably and at the same time high quality and precision production is ensured.

Another object of the invention is to provide a process of grinding wheel manufacture which ensures efficient connection between a grindstone element and a supporting part, capable of transmitting high torques.

Yet another object of the invention is to provide a process of grinding wheel manufacture in which the use of adhesives or other material for fixing the grindstone element to the supporting part is avoided.

SUMMARY OF THE INVENTION

The process of grinding wheel manufacture according to this invention consists in placing a grindstone element in a molding tool and molding a supporting part of said grinding wheel, for the attachment of the latter to an operating machine spindle, directly on to a portion of the grindstone element to form, during said molding, a permanent connection between the grindstone element and said supporting part.

The present invention also provides a grinding wheel comprising an abrasive grindstone element and a supporting part of molded material for the attachment of the grinding wheel to an operating machine spindle wherein the improvement consists in the grindstone element having a portion which is embedded in the molded supporting part and thereby securely connected thereto.

BRIEF DESCRIPTION OF THE DRAWINGS

Further characteristics and advantages of the invention will be better understood from the following description, given by way of non-limiting example, with reference to the accompanying drawings, in which.

DETAILED DESCRIPTION WITH REFERENCE TO THE DRAWINGS

Figure 1:
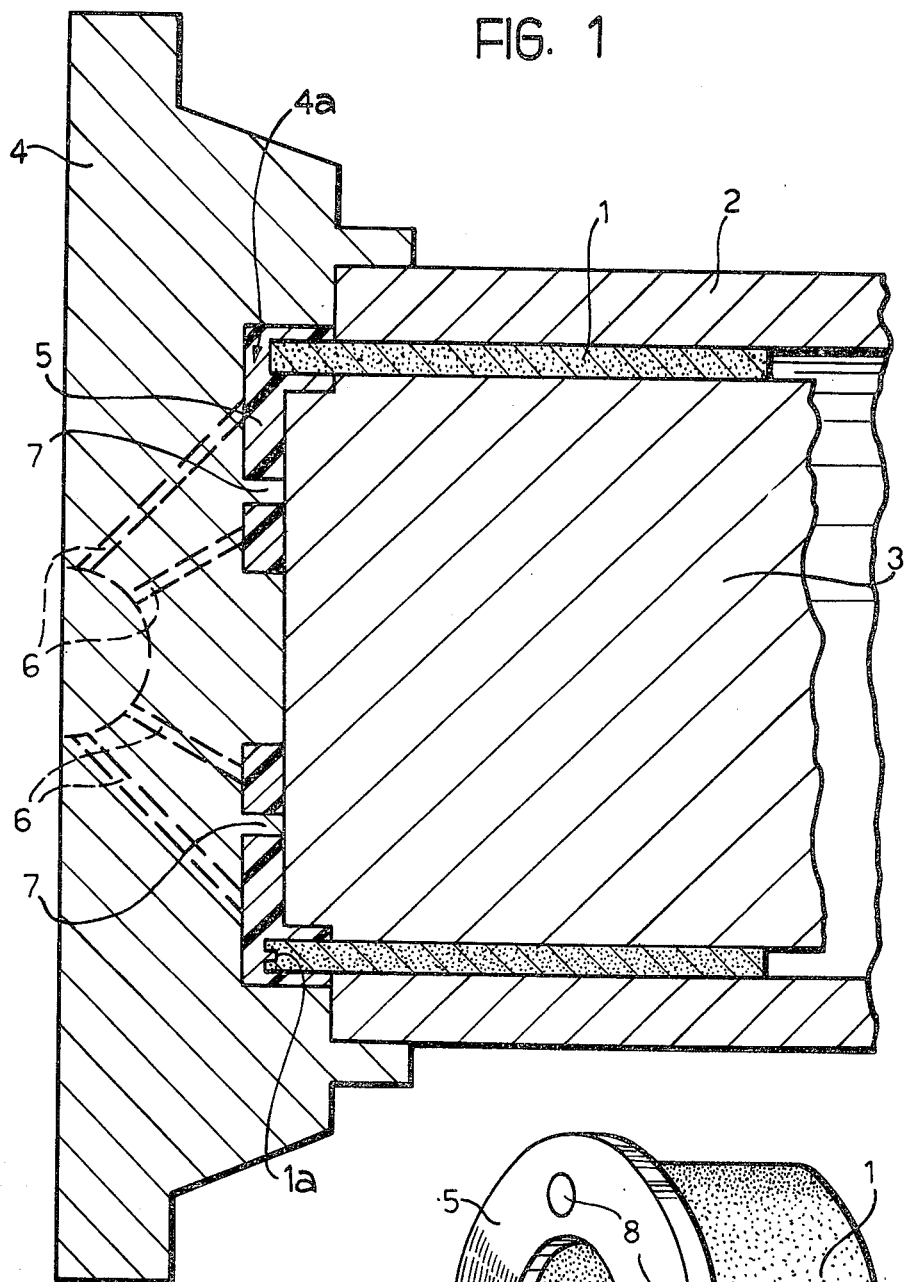
FIG. 1 shows in section a grindstone located in a molding tool during the manufacture a grinding wheel by a method according to the present invention.
Figure 2:
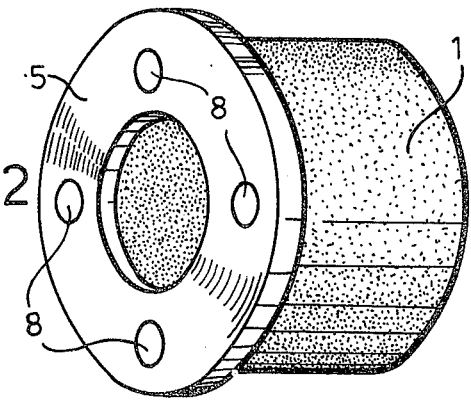
FIG. 2 shows in perspective the grindstone formed in the tool shown in FIG. 1, after opening of the tool.

FIGS. 1 and 2 illustrate the manufacture of a grinding wheel having a hollow cylindrical cup-shaped grindstone element 1 of abraasive material. The grindstone element is positioned in a molding tool comprising a punch suitably prepared. In the punch the grindstone element 1 is located in a space defined between an outer cylindrical element 2 and an inner cylindrical element 3 said space being closed at one end by a baseplate 4.

An annular cavity 4a is defined between the baseplate 4 and the cylindrical elements 2 and 3 of the punch. A supporting part 5 for the mounting of the grinding wheel on a rotary spindle of an operating machine is formed by injection-molding within the cavity 4a. The baseplate 4 has, in manner known per se, internal passages 6 for injection of material, for example plastics material, into the cavity 4a.

For carrying out the process according to this invention it is necessary that the grindstone element 1 of the grinding wheel projects for a certain distance into the molding cavity 4a so that the material injected into the cavity 4a to form the supporting part 5 adheres directly to the part of the element 1 embedded therein.

For the purpose of obtaining secure keying connection between the grindstone element 1 and the supporting part 5 which is capable of transmitting high torques, the end of the element 1 which is embedded in the part 5 is provided with recesses 1a.

The baseplate 4 is provided with projecting pins 7 which bridge the cavity 4a and which form through holes 8 in the part 5 molded therein for the passage of fixing bolts (not shown) for securing the supporting part 5 to the spindle of an operating machine.

After insertion of the grindstone element 1 into the punch and closure of the same, material is injected into the cavity 4a so as to form the supporting part 5. Direct bonding between the element 1 and the part 5 takes place during the stamping operation without the need to use any kind of adhesive or other specific fixing means.

The connection thus formed is very effective by virtue of the adhesion of the plastics or other material constituting the part 5 to the element 1. In the embodiment shown in FIGS. 1 and 2, only a short portion of the grindstone element 1 is embedded in the supporting part 5. To prevent any infiltration of the material from which the part 5 is formed beyond the molding cavity 4a, there are provided in the punch suitable means, known per se, in proximity to the cavity 4a. For example the cylindrical elements 2 and 3 of the punch may be provided with metal expansion packings or passages for a cooling fluid, so that rapid solidification of the material injected into the cavity occurs in those regions where there is danger of infiltration.

After cooling, the punch is opened and the complete grinding wheel extracted.

The process described above is suitable for making grinding wheels of any type, by ensuring in each case that a portion of the grindstone element projects into the cavity in which the supporting part is molded. Thus using a punch of suitable type, it is possible to obtain the grinding wheel shown in FIGS. 3 and 4, having an abrasive grindstone element 9 rigidly connected to a supporting part 10 consisting of plastics material molded during a stamping operation.

Figure 3:
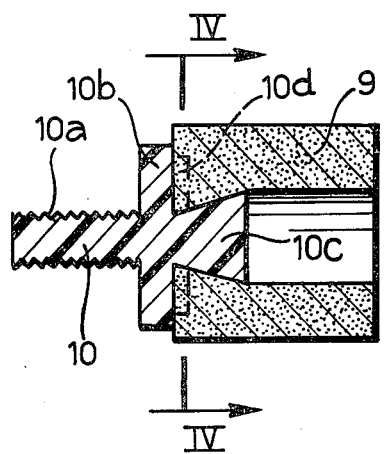
FIG. 3 illustrates in axial section, another type of grinding wheel formed by a process according to the present invention.
Figure 4:
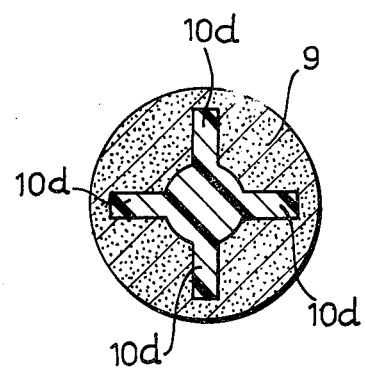
FIG. 4 is a transverse cross section taken along line IV—IV of FIG. 3.

The supporting part 10 in FIGS. 3 and 4 comprises a screwthreaded tang 10a, a flange portion 10b and a frusto-conical portion 10c which tapers in diameter towards the flange portion 10b and which penetrates over a certain distance into a correspondingly tapered frusto-conical portion of the hollow interior of the abrasive grindstone element 9, thereby effectively connecting the element 9 to the supporting part 10.

The end of the grindstone element 9 which abuts the flange portion 10b is formed with radial grooves in which, during the stamping process, fins 10d integral with the flange portion 10b are formed to promote the transmission of high torques between the supporting part 10 and the grindstone element 9.

Figure 5:
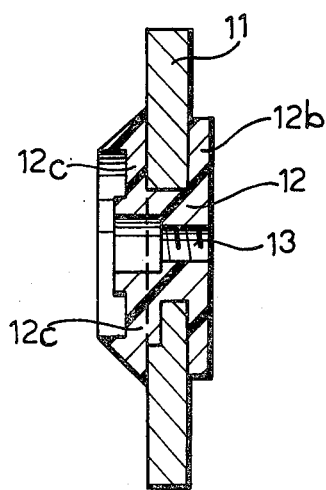
FIG. 5 is an axial section of a further type of grinding wheel made by a process according to the present invention.

FIG. 5 illustrates in axial section a grinding wheel of small thickness, also made by the process of this invention. The grinding wheel has an abrasive disc-like grindstone element 11, which is connected during a stamping process to a supporting part 12 of plastics or other suitable material molded with flanges 12a and 12b lying against the opposite faces of the element 11. The supporting part 12 extends through a central hole in the grindstone element 11 and is formed with a central threaded hole 13 for attachment of the grinding wheel to a rotary spindle. One or both of the embedded faces of the grindstone element 11 is provided with recesses in which portions 12c of plastics or other material are formed when the supporting part 12 is molded, to provide for the efficient transmission of torque between the supporting part 12 and the grindstone element 11.

This invention thus conceived is capable of numerous modifications and variations, all within the scope and spirit of the invention. For example, the materials used and the dimensions of the component parts may be varied as desired.

I claim:

1. In the process of manufacturing a generally cylindrical cup shaped grinding wheel formed of a thin hollow cylindrical grinding element having a radial thickness much less than its axial length, and a plastic element on one end of the cylinder for supporting the grinding wheel on a spindle, the improvement which comprises positioning the cylindrical grinding element in a mold with said end extending into a cavity in the mold with both the inner and outer surfaces of the cylinder at said end being exposed to said cavity, forming said plastic element onto said end by filling said cavity with liquid injection molding plastic under pressure, whereby said cylinder is subjected to equalized radial forces resulting from the injection molding pressure, solidifying said plastic, and removing the finished grinding wheel from the mold.

* * * * *